United States Patent
Sakuragi

(10) Patent No.: US 10,885,391 B2
(45) Date of Patent: Jan. 5, 2021

(54) IMAGE ANALYSIS APPARATUS, METHOD, AND PROGRAM

(71) Applicant: FUJIFILM Corporation, Tokyo (JP)

(72) Inventor: Futoshi Sakuragi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 60 days.

(21) Appl. No.: 16/385,947

(22) Filed: Apr. 16, 2019

(65) Prior Publication Data

US 2019/0244063 A1 Aug. 8, 2019

Related U.S. Application Data

(63) Continuation of application No. PCT/JP2017/036665, filed on Oct. 10, 2017.

(30) Foreign Application Priority Data

Oct. 25, 2016 (JP) .................. 2016-208331

(51) Int. Cl.
*G06K 9/62* (2006.01)
*G06T 1/00* (2006.01)
(Continued)

(52) U.S. Cl.
CPC ......... *G06K 9/6262* (2013.01); *G06F 16/538* (2019.01); *G06K 9/00973* (2013.01);
(Continued)

(58) Field of Classification Search
None
See application file for complete search history.

(56) References Cited

U.S. PATENT DOCUMENTS 8,751,267 B2 * 6/2014 Kurosawa ............. G06F 19/321
705/3
2004/0254763 A1 12/2004 Sakai et al.
(Continued)

FOREIGN PATENT DOCUMENTS

JP H10-127622 A 5/1998
JP 2003-271924 A 9/2003
(Continued)

OTHER PUBLICATIONS

International Search Report issued in PCT/JP2017/036665; dated Nov. 21, 2017.
(Continued)

*Primary Examiner* — Fayyaz Alam
(74) *Attorney, Agent, or Firm* — Studebaker & Brackett PC

(57) ABSTRACT

A storage unit stores at least one first analysis result generated by performing at least one first analysis process on an image of a subject and recovery information enabling recovery of a first analysis state where the first analysis result is generated or link information to the recovery information in a database in association with subject information specifying the subject. An analysis unit generates, in a case where at least one second analysis process generating at least one second analysis result different from the first analysis result is performed, the second analysis result by performing the second analysis process using the recovery information. The storage unit stores the second analysis result in the database in association with the subject information.

9 Claims, 16 Drawing Sheets

(51) Int. Cl.
*G06F 16/538* (2019.01)
*G06K 9/00* (2006.01)
*G06T 7/00* (2017.01)

(52) U.S. Cl.
CPC .............. *G06T 1/00* (2013.01); *G06T 7/0012* (2013.01); *G06T 2207/30056* (2013.01); *G06T 2207/30096* (2013.01)

(56) References Cited

U.S. PATENT DOCUMENTS

| | | | | |
|---|---|---|---|---|
| 2008/0253628 | A1* | 10/2008 | Matsue | G06Q 10/10 382/128 |
| 2017/0124260 | A1* | 5/2017 | McAneny | G06F 19/325 |
| 2018/0089376 | A1* | 3/2018 | Tucker | G06F 19/325 |

FOREIGN PATENT DOCUMENTS

| | | |
|---|---|---|
| JP | 2004-267273 A | 9/2004 |
| JP | 2005-270318 A | 10/2005 |

OTHER PUBLICATIONS

Written Opinion issued in PCT/JP2017/036665; dated Nov. 21, 2017.

* cited by examiner

FIG. 3

| SUBJECT INFORMATION | | | | ANALYSIS RESULT | | | | | LINK INFORMATION |
|---|---|---|---|---|---|---|---|---|---|
| PATIENT ID | PATIENT NAME | SEX | AGE | DIAMETER (mm) | VOLUME (mm³) | TYPE | SECTION | VERSION | |
| ID1234 | Y.S. | MALE | 33 | 0.5 | 1.6 | A | S1 | 1.1 | http://www.aaa.bbb.com/1234 |
| ID1235 | N.I. | MALE | 34 | 0.8 | 2.5 | B | S2 | 1.1 | http://www.aaa.bbb.com/1235 |
| ID1236 | N.F. | MALE | 51 | 1.0 | 3.2 | A | S5 | 1.1 | http://www.aaa.bbb.com/1236 |
| ..... | ..... | ..... | ..... | ..... | ..... | ..... | ..... | ..... | ..... |

| SUBJECT INFORMATION | | | | ANALYSIS RESULT | | | | | | LINK INFORMATION |
|---|---|---|---|---|---|---|---|---|---|---|
| PATIENT ID | PATIENT NAME | SEX | AGE | DIAMETER (mm) | VOLUME (mm³) | TYPE | SECTION | REPRESENTATIVE VALUE | VERSION | |
| ID1234 | Y.S. | MALE | 33 | 0.5 | 1.6 | A | S1 | | 1.1 | http://www.aaa.bbb.com/1234 |
| ID1235 | N.I. | MALE | 34 | 0.8 | 2.5 | B | S2 | 120 | 1.2 | http://www.aaa.bbb.com/1235 |
| ID1236 | N.F. | MALE | 51 | 1.0 | 3.2 | A | S5 | | 1.1 | http://www.aaa.bbb.com/1236 |

FIG. 7

| PATIENT ID | SEX | AGE | TUMOR DIAMETER | REPRESENTATIVE VALUE |
|---|---|---|---|---|
| ID1234 | MALE | 33 | 0.5 | 152 |
| ID1235 | MALE | 34 | 0.8 | 120 |
| ID1236 | MALE | 51 | 1.0 | NONE |
| ID1237 | FEMALE | 45 | 1.5 | 150 |
| ID1238 | FEMALE | 48 | 0.7 | 80 |

FIG. 8

| PATIENT ID | SEX | AGE | TUMOR DIAMETER | REPRESENTATIVE VALUE |
|---|---|---|---|---|
| ID1234 | MALE | 33 | 0.5 | 152 |
| ID1235 | MALE | 34 | 0.8 | 120 |
| ID1236 | MALE | 51 | 1.0 | NONE |
| ID1237 | FEMALE | 45 | 1.5 | CALCULATING |
| ID1238 | FEMALE | 48 | 0.7 | 80 |

FIG. 10

| PATIENT ID | SEX | AGE | TUMOR DIAMETER | VERSION |
|---|---|---|---|---|
| ID1234 | MALE | 33 | 0.6 | 1.2 |
| ID1235 | MALE | 34 | 0.8 | 1.2 |
| ID1236 | MALE | 51 | 1.1 | 1.2 |
| ID1237 | FEMALE | 45 | 1.5 | 1.2 |
| ID1238 | FEMALE | 48 | 0.7 | 1.2 |
| ⋮ | ⋮ | ⋮ | ⋮ | ⋮ |

FIG. 11

| PATIENT ID | SEX | AGE | TUMOR DIAMETER | VERSION |
|---|---|---|---|---|
| ID1234 | MALE | 33 | 0.6 | 1.2 |
| ID1235 | MALE | 34 | 0.8 | 1.2 |
| ID1236 | MALE | 51 | 1.0 | 1.1 |
| ID1237 | FEMALE | 45 | 1.4 | 1.1 |
| ID1238 | FEMALE | 48 | 0.7 | 1.2 |
| ⋮ | ⋮ | ⋮ | ⋮ | ⋮ |

FIG. 12

| SUBJECT INFORMATION | | | | ANALYSIS RESULT | | | | | | |
|---|---|---|---|---|---|---|---|---|---|---|
| PATIENT ID | PATIENT NAME | SEX | AGE | DIAMETER (mm) | VOLUME (mm³) | TYPE | SECTION | VERSION | DIAMETER (mm) | VERSION |
| ID1234 | Y.S. | MALE | 33 | 0.5 | 1.6 | A | S1 | 1.1 | 0.6 | 1.2 |
| ID1235 | N.I. | MALE | 34 | 0.8 | 2.5 | B | S2 | 1.1 | 0.8 | 1.2 |
| ID1236 | N.F. | MALE | 51 | 1.0 | 3.2 | A | S5 | 1.1 | 1.1 | 1.2 |

FIG. 13

| PATIENT ID | SEX | AGE | TUMOR DIAMETER | VERSION | TUMOR DIAMETER | VERSION |
|---|---|---|---|---|---|---|
| ID1234 | MALE | 33 | 0.5 | 1.1 | 0.6 | 1.2 |
| ID1235 | MALE | 34 | 0.8 | 1.1 | 0.8 | 1.2 |
| ID1236 | MALE | 51 | 1.0 | 1.1 | 1.1 | 1.2 |
| ID1237 | FEMALE | 45 | 1.4 | 1.1 | 1.5 | 1.2 |
| ID1238 | FEMALE | 48 | 0.6 | 1.1 | 0.7 | 1.2 |
| ..... | ..... | ..... | ..... | ..... | ..... | ..... |

FIG. 15

| SUBJECT INFORMATION | | | | ANALYSIS RESULT | | | | | | LINK INFORMATION |
|---|---|---|---|---|---|---|---|---|---|---|
| PATIENT ID | PATIENT NAME | SEX | AGE | DIAMETER (mm) | VOLUME (mm³) | TYPE | SECTION | REPRESENTATIVE VALUE | VERSION | |
| ID1234 | Y.S. | MALE | 33 | 0.5 | 1.6 | A | S1 | NOT CALCULATED | 1.1 | http://www.aaa.bbb.com/1234 |
| ID1235 | N.I. | MALE | 34 | 0.8 | 2.5 | B | S2 | 120 | 1.2 | http://www.aaa.bbb.com/1235 |
| ID1236 | N.F. | MALE | 51 | 1.0 | 3.2 | A | S5 | 150 | 1.1 | http://www.aaa.bbb.com/1236 |
| ..... | ..... | ..... | ..... | ..... | ..... | ..... | ..... | ..... | ..... | ..... |

30

| PATIENT ID | SEX | AGE | TUMOR DIAMETER | REPRESENTATIVE VALUE |
|---|---|---|---|---|
| ID1234 | MALE | 33 | 0.5 | NOT CALCULATED |
| ID1235 | MALE | 34 | 0.8 | 120 |
| ID1236 | MALE | 51 | 1.0 | NONE |
| ID1237 | FEMALE | 45 | 1.5 | 150 |
| ID1238 | FEMALE | 48 | 0.7 | 80 |

FIG. 18

| SUBJECT INFORMATION | | | | ANALYSIS RESULT | | | | | | | |
|---|---|---|---|---|---|---|---|---|---|---|---|
| PATIENT ID | PATIENT NAME | SEX | AGE | DIAMETER (mm) | VOLUME (mm³) | TYPE | SECTION | VERSION | DIAMETER (mm) | VERSION | RELIABILITY |
| ID1234 | Y.S. | MALE | 33 | 0.5 | 1.6 | A | S1 | 1.1 | 0.6 | 1.2 | 1.2 |
| ID1235 | N.I. | MALE | 34 | 0.8 | 2.5 | B | S2 | 1.1 | 0.8 | 1.2 | 1.0 |
| ID1236 | N.F. | MALE | 51 | 1.0 | 3.2 | A | S5 | 1.1 | 1.1 | 1.2 | 2.4 |
| ..... | ..... | ..... | ..... | ..... | ..... | ..... | ..... | ..... | ..... | ..... | ..... |

| PATIENT ID | SEX | AGE | TUMOR DIAMETER | VERSION | TUMOR DIAMETER | VERSION | RELIABILITY |
|---|---|---|---|---|---|---|---|
| ID1234 | MALE | 33 | 0.5 | 1.1 | 0.6 | 1.2 | 1.2 |
| ID1235 | MALE | 34 | 0.8 | 1.1 | 0.8 | 1.2 | 1.0 |
| ID1236 | MALE | 51 | 1.0 | 1.1 | 2.4 | 1.2 | 2.4 |
| ID1237 | FEMALE | 45 | 1.4 | 1.1 | 0.7 | 1.2 | 0.5 |
| ID1238 | FEMALE | 48 | 0.6 | 1.1 | 0.7 | 1.2 | 1.1 |
| ..... | ..... | ..... | ..... | ..... | ..... | ..... | ..... |

ID

IMAGE ANALYSIS APPARATUS, METHOD, AND PROGRAM

CROSS REFERENCE TO RELATED APPLICATIONS

The present application is a Continuation of PCT International Application No. PCT/JP2017/036665 filed on Oct. 10, 2017, which claims priority under 35 U.S.C. § 119(a) to Japanese Patent Application No. 2016-208331 filed on Oct. 25, 2016. Each of the above applications is hereby expressly incorporated by reference, in its entirety, into the present application.

BACKGROUND

Technical Field

The technology of the present disclosure relates to an image analysis apparatus, a method, and a program performing an analysis process on an image and storing an analysis result generated by the analysis process in a database.

Related Art

In recent years, high quality high resolution 3-dimensional images have been used in diagnostic imaging along with advances in medical apparatuses such as a computed tomography (CT) apparatus and a magnetic resonance imaging (MRI) apparatus. In addition, by analyzing such a 3-dimensional image, 3-dimensional shapes of various organs present in a body can be obtained. Furthermore, a relative positional relationship and a solid structure of each tissue of arteries, veins, tumors, and the like present in the organ can be obtained. In this case, a specific organ and a specific structure inside the organ are extracted using various image processing algorithms, and their solid structures are obtained by projecting the 3-dimensional shapes to a 2-dimensional plane using a display method such as volume rendering (VR). In addition, a tumor or the like is extracted by analyzing the image using computer-aided diagnosis (CAD), and the size, type, and the like of the tumor are obtained as an analysis result. The analysis result generated by the analysis process is stored in a database in association with subject information such as a patient name, sex, and age and is used in diagnosis.

Various methods for storing the analysis result in the database have been suggested. For example, JP2003-271924A suggests a method of storing information related to the type of process module performing the analysis process, a parameter used by the process module, the type of template used in analysis, and the like in the database along with the analysis result. According to the method disclosed in JP2003-271924A, the same process as that in the case of generating the stored analysis result can be performed again using the information stored along with the analysis result.

An item that has not been previously included in the analysis result may be newly added to the analysis result due to a version update of software for performing the analysis process. For example, in an old version of the software, a representative value such as the average value of signal values in the tumor is not calculated. However, in a case where the representative value of the signal values of the tumor is newly calculated due to a version update, the representative value of the signal values in the tumor is newly added to the analysis result. In this case, the added item is not present in the past analysis result stored in the database, and the added item cannot be used in the past analysis result unless a user adds the new item to the database. In addition, in a case where analysis performance is improved by the version update of the software, indicators of the analysis differ between the past analysis result stored in the database and a new analysis result. In this case, comparison between the past analysis result and the new analysis result, and statistic analysis using the past analysis result and the new analysis result may not be accurately performed.

SUMMARY

The analysis process can be performed again using the method disclosed in JP2003-271924A. However, performing the analysis process again leads to an increase in calculation amount, and the load of the process of the analysis apparatus is high.

The technology of the present disclosure is conceived in view of such a matter. An object of the technology of the present disclosure is to enable a new analysis result to be stored in a database while reducing a calculation amount.

An image analysis apparatus according to the present disclosure comprises storage unit for storing at least one first analysis result generated by performing at least one first analysis process on an image of a subject and recovery information enabling recovery of a first analysis state where the first analysis result is generated or link information to the recovery information in a database in association with subject information specifying the subject, and analysis unit for generating, in a case where at least one second analysis process generating at least one second analysis result different from the first analysis result is performed, the second analysis result by performing the second analysis process using the recovery information. The storage unit stores the second analysis result in the database in association with the subject information.

The "analysis state" is a state of analysis in a case where the first analysis result is generated by performing the first analysis process on the image. For example, a state where various processes are performed on the image until an analysis result is acquired is the analysis state. For example, in a case where a specific structure inside the subject is extracted, a state where the specific structure is extracted by an analysis process of extracting the specific structure is the analysis state.

The "recovery information" is information that enables recovery of the first analysis state by referring to the recovery information, and is information including an analysis history representing the process content and the process result of the first analysis process. Specifically, an algorithm of the analysis process, the version of software performing the analysis process, an image used in the analysis process in a case where the image includes a plurality of images like a 3-dimensional image, an image displayed in the analysis process, the extraction result of a structure in a case where a structure is extracted from the image by the analysis process, the extraction result of a lesion in a case where a lesion such as a tumor is extracted from the image by the analysis process, and the like can be used as the recovery information.

In the image analysis apparatus according to the present disclosure, the analysis unit may recover the first analysis state based on the recovery information and perform the second analysis process using the first analysis state.

In addition, the image analysis apparatus according to the present disclosure may further comprise search unit for searching the database for the second analysis result. The analysis unit may perform the second analysis process only in a case where only the first analysis result is associated and the recovery information or the link information is associated with the first analysis result.

In addition, in the image analysis apparatus according to the present disclosure, the analysis unit may calculate reliability of the second analysis result. The storage unit may store the second analysis result in the database only in a case where the reliability satisfies a storage condition for the database.

In addition, in the image analysis apparatus according to the present disclosure, the analysis unit may calculate reliability of the second analysis result. The storage unit may storage the reliability in the database in association with the second analysis result.

In addition, in the image analysis apparatus according to the present disclosure, the storage unit may store the second analysis result in the database in addition to the first analysis result.

In addition, in the image analysis apparatus according to the present disclosure, the storage unit may store the second analysis result in the database instead of the first analysis result.

An image analysis method according to the present disclosure comprises storing at least one first analysis result generated by performing at least one first analysis process on an image of a subject and recovery information enabling recovery of a first analysis state where the first analysis result is generated or link information to the recovery information in a database in association with subject information specifying the subject, generating, in a case where at least one second analysis process generating at least one second analysis result different from the first analysis result is performed, the second analysis result by performing the second analysis process using the recovery information, and storing the second analysis result in the database in association with the subject information.

The image analysis method according to the present disclosure may be provided as a program for causing a computer to execute the image analysis method.

Another image analysis apparatus according to the present disclosure comprises a memory that stores an instruction to be executed by a computer, and a processor that is configured to execute the stored instruction. The processor executes a process of storing at least one first analysis result generated by performing at least one first analysis process on an image of a subject and recovery information enabling recovery of a first analysis state where the first analysis result is generated or link information to the recovery information in a database in association with subject information specifying the subject, generating, in a case where at least one second analysis process generating at least one second analysis result different from the first analysis result is performed, the second analysis result by performing the second analysis process using the recovery information, and storing the second analysis result in the database in association with the subject information.

According to the present disclosure, in a case where at least one second analysis process generating at least one second analysis result different from the first analysis result is performed, the second analysis result is generated by performing the second analysis process using the recovery information enabling recovery of the first analysis state where the first analysis result is generated. The second analysis result is stored in the database in association with the subject information. Thus, by referring to the first analysis state in the case of performing the second analysis process, a process performed in the first analysis process is not performed again, and only a process newly added to the second analysis process may be performed. Accordingly, a calculation amount for performing the second analysis process can be reduced, and the second analysis result can be stored in the database.

BRIEF DESCRIPTION OF THE DRAWINGS

FIG. 3 is a diagram illustrating an example of data stored in a database.

FIG. 5 is a diagram illustrating an example of data stored in the database.

FIG. 7 is a diagram illustrating a search result in the first embodiment.

FIG. 8 is a diagram illustrating a search result in the first embodiment.

FIG. 10 is a diagram illustrating a search result in the second embodiment.

FIG. 11 is a diagram illustrating a search result in the second embodiment.

FIG. 12 is a diagram illustrating the database storing a second analysis result along with a first analysis result.

FIG. 13 is a diagram illustrating another search result in the second embodiment.

FIG. 15 is a diagram illustrating a database storing data in a modification example of the third embodiment.

FIG. 17 is a flowchart illustrating a process performed at the time of search in a fourth embodiment.

FIG. 18 is a diagram illustrating a database storing data in a modification example of the fourth embodiment.

FIG. 19 is a diagram illustrating a search result in the modification example of the fourth embodiment.

DETAILED DESCRIPTION

Figure 1:
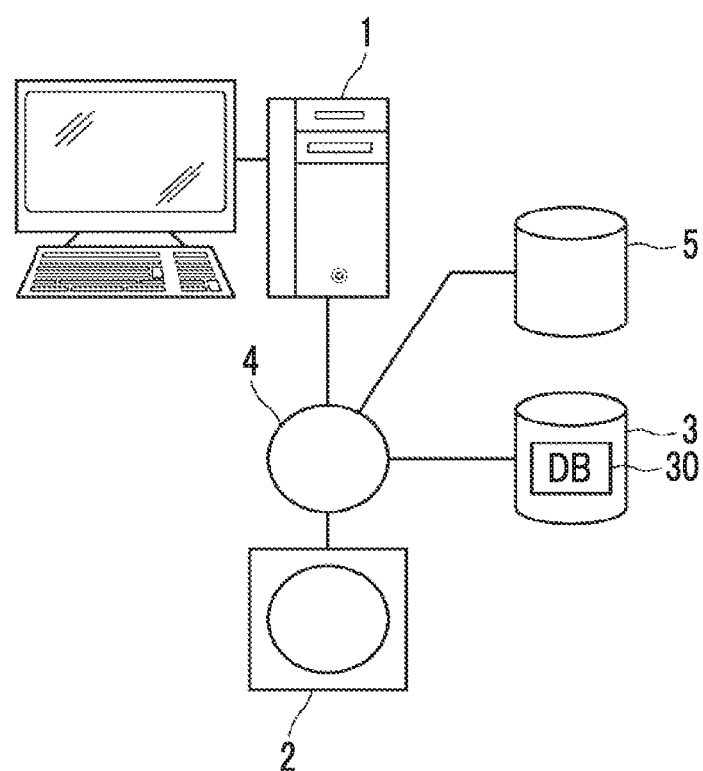
FIG. 1 is a hardware configuration diagram illustrating a summary of a diagnosis support system to which an image analysis apparatus according to an embodiment of the present invention is applied.

Hereinafter, embodiments of the present invention will be described with reference to the drawings. FIG. 1 is a hardware configuration diagram illustrating a summary of a diagnosis support system to which an image analysis apparatus according to a first embodiment of the present invention is applied. As illustrated in FIG. 1, in the diagnosis support system, an image analysis apparatus 1 according to the first embodiment, a 3-dimensional image capture apparatus 2, and a first server 3 are connected in a state capable of communicating through a network 4. In addition, a second server 5 for storing a snapshot described below is connected to the network 4. In the image analysis apparatus 1 of the diagnosis support system, a 3-dimensional image of a subject is analyzed, and an analysis result is transmitted and stored in the first server 3.

The 3-dimensional image capture apparatus 2 is an apparatus that generates a 3-dimensional image representing a diagnosis target part by imaging the diagnosis target part of the subject. Specifically, the 3-dimensional image capture apparatus 2 is a CT apparatus, an MRI apparatus, a positron emission tomography (PET) apparatus, and the like. The 3-dimensional image generated by the 3-dimensional image capture apparatus 2 is transmitted to the first server 3 and stored. In the present embodiment, the diagnosis target part of a patient who is the subject is a liver. The 3-dimensional image capture apparatus 2 is a CT apparatus. A CT image of the abdomen of the subject is generated as the 3-dimensional image.

The first server 3 is a computer storing and managing various data and comprises a high capacity external storage device and database management software. The first server 3 communicates with another apparatus through the wired or wireless network 4 and transmits and receives image data and various information. Specifically, image data such as the 3-dimensional image generated by the 3-dimensional image capture apparatus 2 and various data including the analysis result in the image analysis apparatus 1 are acquired through the network and are stored and managed in a recording medium such as the high capacity external storage device. The storage format of the image data and communication between each apparatus through the network 4 are based on a protocol such as digital imaging and communication in medicine (DICOM).

In the first server 3, the analysis result of the image analysis apparatus 1 is stored by a database (DB) 30 in association with a 3-dimensional image G0 subjected to analysis and subject information such as a patient name, sex, and age. Access to the database 30 can be made from the image analysis apparatus 1 through the network 4. In addition, information stored in the database 30 can be searched from the image analysis apparatus 1 using the patient name or the like as a search condition.

The second server 5 is a computer storing and managing various data and comprises a high capacity external storage device and database management software. The second server 5 communicates with another apparatus through the wired or wireless network 4 and stores the snapshot or the like described below.

The image analysis apparatus 1 is implemented by installing software containing an image analysis program according to the embodiment of the present invention on one computer. The computer may be a workstation or a personal computer directly operated by a doctor performing diagnosis, or may be a server computer connected to the workstation or the personal computer through a network. The software containing the image analysis program is distributed as a recording on a recording medium such as a digital versatile disc (DVD) or a compact disk read only memory (CD-ROM) and is installed on the computer from the recording medium. Alternatively, the software is stored in a storage device of a server computer connected to a network or in a network storage in a state enabling external access thereto and is downloaded and installed on a computer used by a doctor as necessary.

Figure 2:
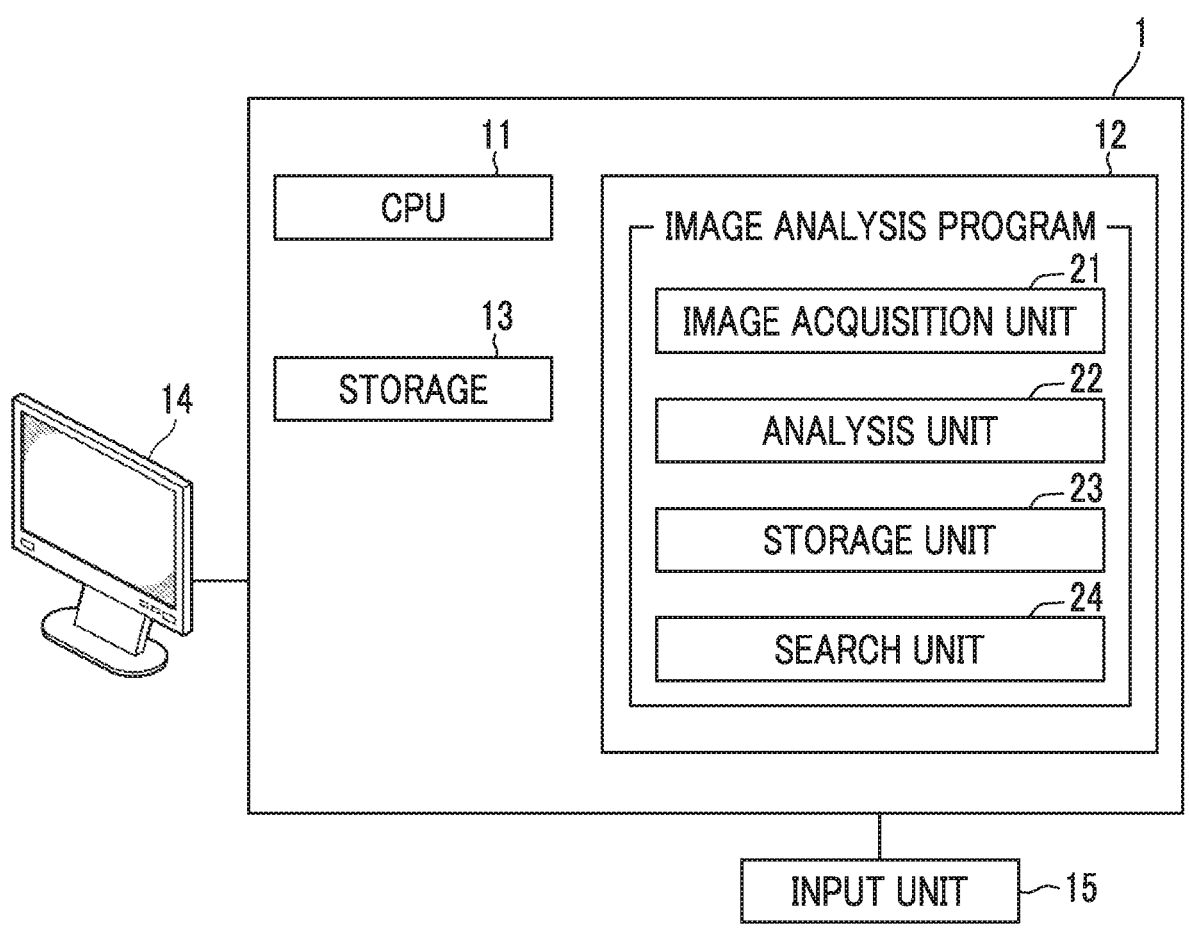
FIG. 2 is a diagram illustrating a schematic configuration of the image analysis apparatus.

FIG. 2 is a diagram illustrating a schematic configuration of the image analysis apparatus implemented by installing the software containing the image analysis program on the computer. As illustrated in FIG. 2, the image analysis apparatus 1 comprises a central processing unit (CPU) 11, a memory 12, and a storage 13 as a configuration of a standard workstation. In addition, a display 14 such as a liquid crystal display and an input unit 15 including a mouse, a keyboard, and the like are connected to the image analysis apparatus 1.

The storage 13 stores the 3-dimensional image of the subject acquired from the first server 3 through the network 4 and various information including information necessary for processing. In the present embodiment, the 3-dimensional image G0 in which the liver of the subject is set as the diagnosis target part is stored.

In addition, the memory 12 stores the software containing the image analysis program. The image analysis program defines an image acquisition process of acquiring the 3-dimensional image G0 acquired by the 3-dimensional image capture apparatus 2, an analysis process of analyzing the 3-dimensional image G0, a storage process of storing the analysis result and link information described below in the database, and a search process of searching the database as processes to be executed by the CPU 11.

By causing the CPU 11 to execute the processes in accordance with the program, the computer functions as an image acquisition unit 21, an analysis unit 22, a storage unit 23, and a search unit 24. The image analysis apparatus 1 may comprise a plurality of processors or processing circuits performing the image acquisition process, the analysis process, the storage process, and the search process, respectively. The image analysis apparatus 1 of the present embodiment may be configured with only the analysis unit 22, the storage unit 23, and the search unit 24.

The image acquisition unit 21 acquires the 3-dimensional image G0 of the abdomen of the subject from the first server 3. In a case where the 3-dimensional image G0 is already stored in the storage 13, the image acquisition unit 21 may acquire the 3-dimensional image G0 from the storage 13.

The analysis unit 22 generates the analysis result by performing the analysis process on the 3-dimensional image G0 in accordance with the image analysis program. In the present embodiment, the liver and surrounding tissues such as portal veins, veins, and arteries inside the liver or around the liver are extracted from the 3-dimensional image G0. The extraction of the liver and the surrounding region may use any well-known method. In addition, the liver and the surrounding tissues may be extracted from the 3-dimensional image G0 by a manual operation of an operator. In the present embodiment, the extraction of the liver and the surrounding tissues is a part of the analysis process. Furthermore, the analysis unit 22 extracts a tumor by analyzing the 3-dimensional image G0 using CAD. The analysis unit 22 generates the diameter and the volume of the extracted tumor and the type and the position of the tumor in a section of the liver as the analysis result.

The analysis unit 22 generates recovery information that enables recovery of an analysis state where the analysis result is generated as a snapshot. The "analysis state" is a state of analysis in a case where the analysis result is generated by performing the analysis process on the 3-dimensional image G0. For example, in the present embodiment, the liver, the surrounding tissues, and the tumor are extracted by the analysis process, and the analysis result is generated. In this case, a state where various processes such as processing the 3-dimensional image G0 are performed or various processes are performed on the 3-dimensional image G0 until the analysis result is acquired is the analysis state.

The "recovery information", that is, the snapshot, is information that enables recovery of the analysis state performed by the analysis unit 22 by referring to the recovery information, and is information including an analysis history representing the process content and the process result of the analysis process. In the present embodiment, the version of the software containing the image analysis program is included in the snapshot. In addition, since the liver, the surrounding tissues, and the tumor are extracted in the analysis process, an algorithm of the extraction of the liver, the surrounding tissues, and the tumor is included in the snapshot. The extraction result of the liver, the surrounding tissues, and the tumor, that is, the 3-dimensional image of the extracted liver, the surrounding tissues, and the tumor, is also included in the snapshot. In addition, since the 3-dimensional image G0 is configured with tomogram images in a plurality of cross sections, information specifying a tomogram image referred to or used in the case of extracting the liver, the surrounding tissues, and the tumor is also included in the snapshot.

The storage unit 23 transmits the analysis result generated by the analysis unit 22 to the first server 3 and stores the analysis result in the database 30 in association with the subject information such as a patient ID, the patient name, sex, and age and the 3-dimensional image G0. In addition, the snapshot is transmitted and stored in the second server 5. The link information to the snapshot stored in the second server 5 is stored in the database 30 of the first server 3.

FIG. 3 is a diagram illustrating an example of data stored in the database. As illustrated in FIG. 3, the database 30 stores the subject information, the analysis result, and the link information to the snapshot. The subject information includes the patient ID, the patient name, sex, and age. The patient name is denoted by initials. The analysis result includes the diameter (simply shown as diameter) and the volume of the tumor, the type (simply shown as type) of tumor, and the section (simply shown as section) of the liver in which the tumor is present. In addition, the version of the software used in analysis is also included in the analysis result. In the data illustrated in FIG. 3, analysis is performed using version 1.1 of the software for all patient IDs. While link information to the 3-dimensional image G0 is stored in each data of the database 30 for association with the 3-dimensional image G0 used in analysis, illustration is not provided in FIG. 3 and the subsequent description for simplification of description.

The search unit 24 searches for information stored in the database 30 in accordance with a search condition input by the operator from the input unit 15.

Figure 4:
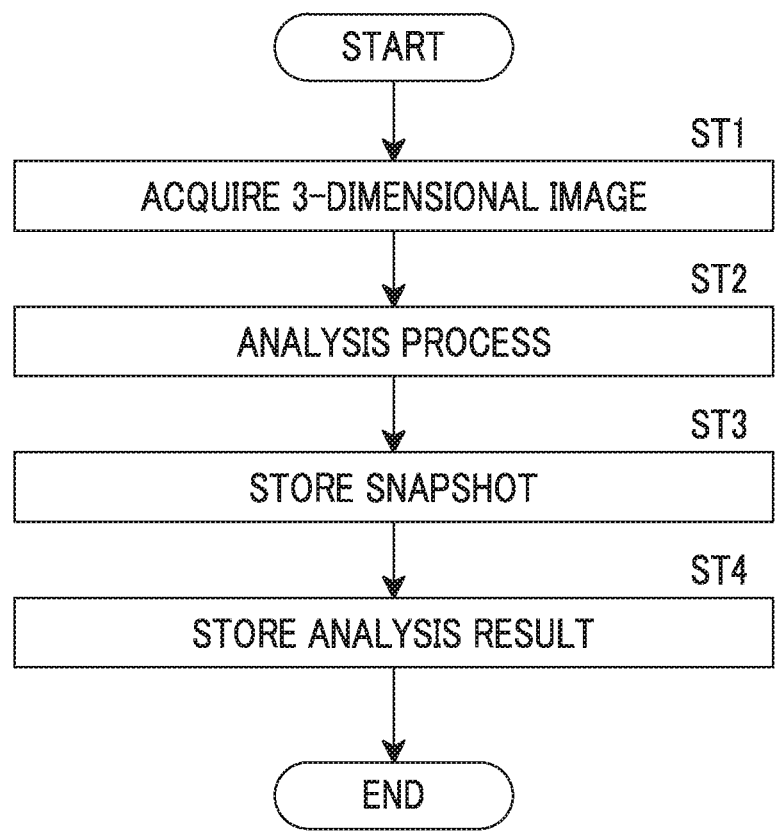
FIG. 4 is a flowchart illustrating a process performed at the time of analysis in a first embodiment.

Hereinafter, processes performed in the analysis unit 22, the storage unit 23, and the search unit 24 of the present embodiment will be described in detail. FIG. 4 is a flowchart illustrating a process performed at the time of analysis in the present embodiment. First, the image acquisition unit 21 acquires the 3-dimensional image G0 as an analysis target (step ST1). The analysis unit 22 performs the analysis process on the 3-dimensional image G0 and generates the analysis result (step ST2). In this case, the snapshot is also generated. The storage unit 23 transmits and stores the snapshot in the second server 5 (step ST3) and transmits the analysis result to the first server 3 and stores the analysis result in the database 30 in association with the 3-dimensional image G0, the subject information, and the link information to the snapshot (step ST4). The process is finished.

Next, a process performed at the time of search will be described. Here, an analysis function is added by a version update of the software containing the image analysis program, and a representative value of signal values of the tumor in the 3-dimensional image G0 is calculated. The representative value is exemplified by an average value, a maximum value, and a variance value. In this case, the analysis process based on the old version of the software corresponds to a first analysis process. The analysis result generated by the first analysis process and stored in the database 30 corresponds to a first analysis result. The analysis process based on the new version of the software corresponds to a second analysis process. The analysis result generated by the second analysis process corresponds to a second analysis result. In a case where the version of the software is updated, the analysis result based on the old version of the software coexists with the analysis result based on the new version of the software in the database 30. For example, as illustrated in FIG. 5, while the version of the software for patients of ID 1234 and ID 1236 is 1.1, the version of the software for a patient of ID 1235 is updated to 1.2 Thus, for only the patient of ID 1235, the representative value of the tumor is calculated by the analysis process based on the updated version of the software and stored in the database 30.

Figure 6:
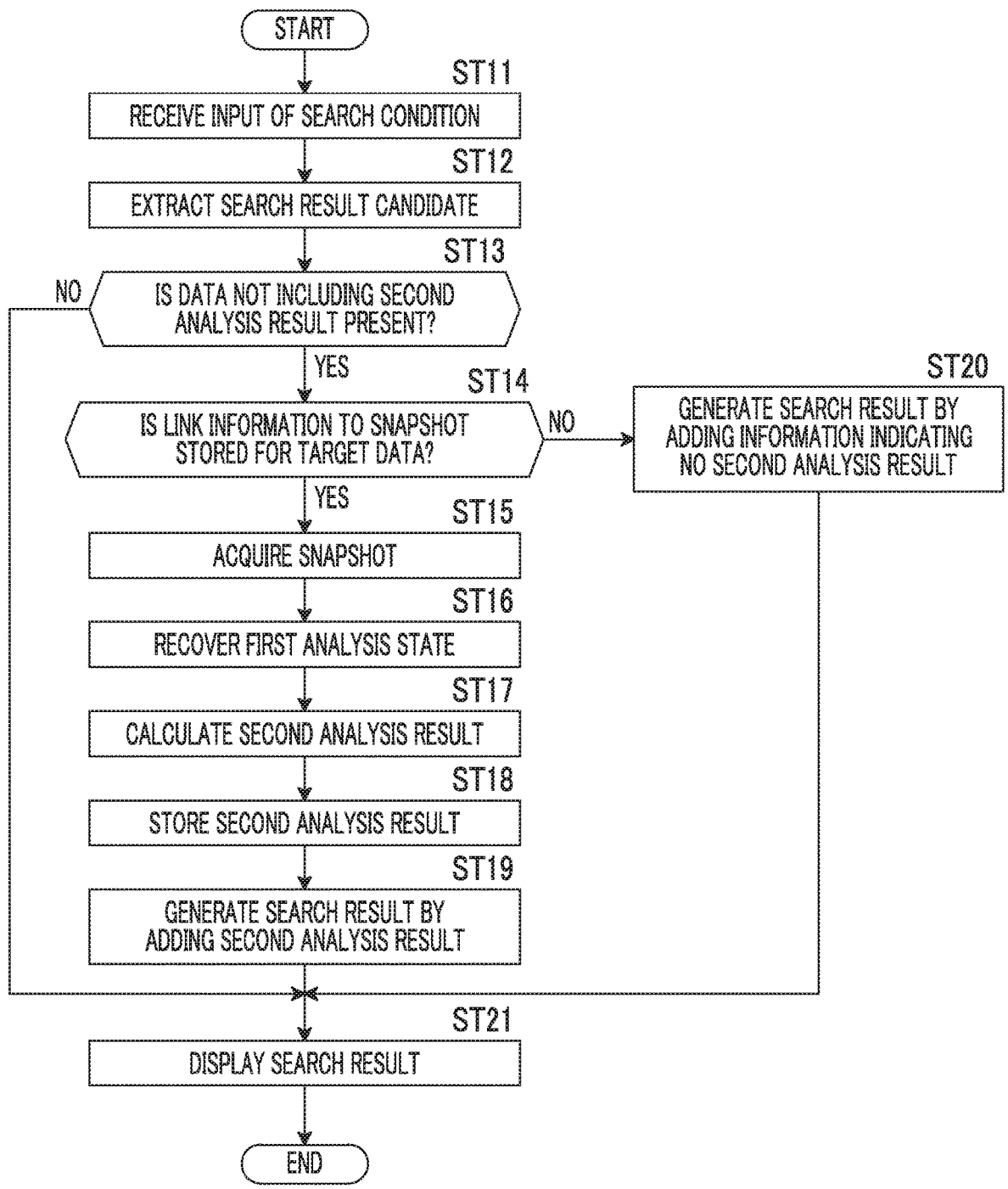
FIG. 6 is a flowchart illustrating a process performed at the time of search in the first embodiment.

FIG. 6 is a flowchart illustrating the process performed at the time of search in the first embodiment. In a case where a search is performed, the search condition is input from the input unit 15. The sex, age, and the like of the patient can be used as the search condition. Here, a search condition for searching for the diameter of the tumor of a patient of any sex and any age and the representative value of the signal values of the tumor is input. First, the search unit 24 receives the input of the search condition from the input unit 15 (step ST11), searches the database 30 stored in the first server 3 in accordance with the search condition, and extracts data complying with the input search condition including data not storing the representative value of the signal values as a search result candidate (step ST12).

The search unit 24 determines whether or not data that does not include the representative value of the signal values, that is, the second analysis result, is present in the search result candidate (step ST13). In a case where a positive determination is made in step ST13, a determination as to whether or not the link information to the snapshot is stored in the database 30 for the data (hereinafter, referred to as target data) not including the representative value of the signal values is performed (step ST14). In a case where a positive determination is made in step ST14, the analysis unit 22 acquires the snapshot from the link information stored in the database 30 (step ST15) and recovers a first analysis state that is the analysis state in the case of generating the analysis result stored in the database 30, that is, the first analysis result (step ST16). The analysis unit 22 calculates the representative value of the signal values, that is, the second analysis result, by performing the second analysis process using the recovered first analysis state (step ST17). In this case, by using the first analysis state, the process of extracting the liver and the surrounding tissues from the 3-dimensional image G0, the process of selecting the tomogram image to extract the tumor, and a process necessary for analysis of the 3-dimensional image G0 do not need to be performed again. Then, the storage unit 23 transmits the second analysis result to the first server 3 and stores the second analysis result in the database 30 (step ST18). In addition, the search unit 24 generates a search result by adding the second analysis result to the target data (step ST19).

In a case where a negative determination is made in step ST14, the snapshot cannot be used for the target data. Thus, for the target data, the search result is generated by adding information indicating that the second analysis result is not present (step ST20). In a case where a negative determination is made in step ST14, the target data may be deleted from the search result candidate.

The search unit 24 displays the search result on the display 14 (step ST21), and the process is finished. In a case where a negative determination is made in step ST13, a transition is made to step ST21, and the search result candidate is displayed on the display 14 as the search result.

FIG. 7 is a diagram illustrating the search result in the first embodiment. The search result includes the sex and age of the patient, the tumor diameter, and the representative value of the signal values of the tumor in accordance with the search condition. In the database 30 illustrated in FIG. 5, the representative value of the signal values is not calculated in the data having the patient ID of ID 1234 and ID 1236. However, since the representative value of the signal values is calculated at the time of search, the representative value is calculated in the data having ID 1234 in the search result. For data having the patient ID of ID 1236, the snapshot cannot be acquired. Thus, the representative value is set as "none".

The search result candidate may be displayed first on the display 14, and the second analysis process for the target data may be performed in the background. In this case, as illustrated in FIG. 8, for data of ID 1237 for which the second analysis result is being calculated, "calculating" may be displayed, and the calculation result may be displayed after the calculation is finished.

In the first embodiment, in a case where the second analysis process of generating the representative value of the signals values of the tumor, that is, the second analysis result, not calculated in the software before the version update is performed, the first analysis state is recovered using the snapshot enabling recovery of the first analysis state where the first analysis result registered in the database is generated. The second analysis result is generated by performing the second analysis process using the first analysis state. The second analysis result is stored in the database 30. Thus, by referring to the first analysis state in the case of performing the second analysis process, the process performed in the first analysis process is not performed again, and only a process newly added to the second analysis process may be performed. Accordingly, a calculation amount for performing the second analysis process can be reduced, and the second analysis result can be stored in the database 30.

In addition, by performing the second analysis process on only data associated with the link information to the snapshot in the first analysis result, the second analysis process can be more efficiently performed.

Next, a second embodiment of the present invention will be described. A configuration of an image analysis apparatus according to the second embodiment is the same as the configuration of the image analysis apparatus according to the first embodiment illustrated in FIG. 2, and only the performed process is different. Thus, a detailed description of the apparatus will not be repeated. The second embodiment is different from the first embodiment in that in a case where the accuracy of extraction of the tumor is improved by the version update of the software containing the image analysis program, the tumor is extracted based on the updated version of the software at the time of search. The image analysis program performs the process of extracting the liver and the surrounding tissues. Here, the accuracy of extraction is improved by improving the process of extracting the tumor by the version update.

Figure 9:
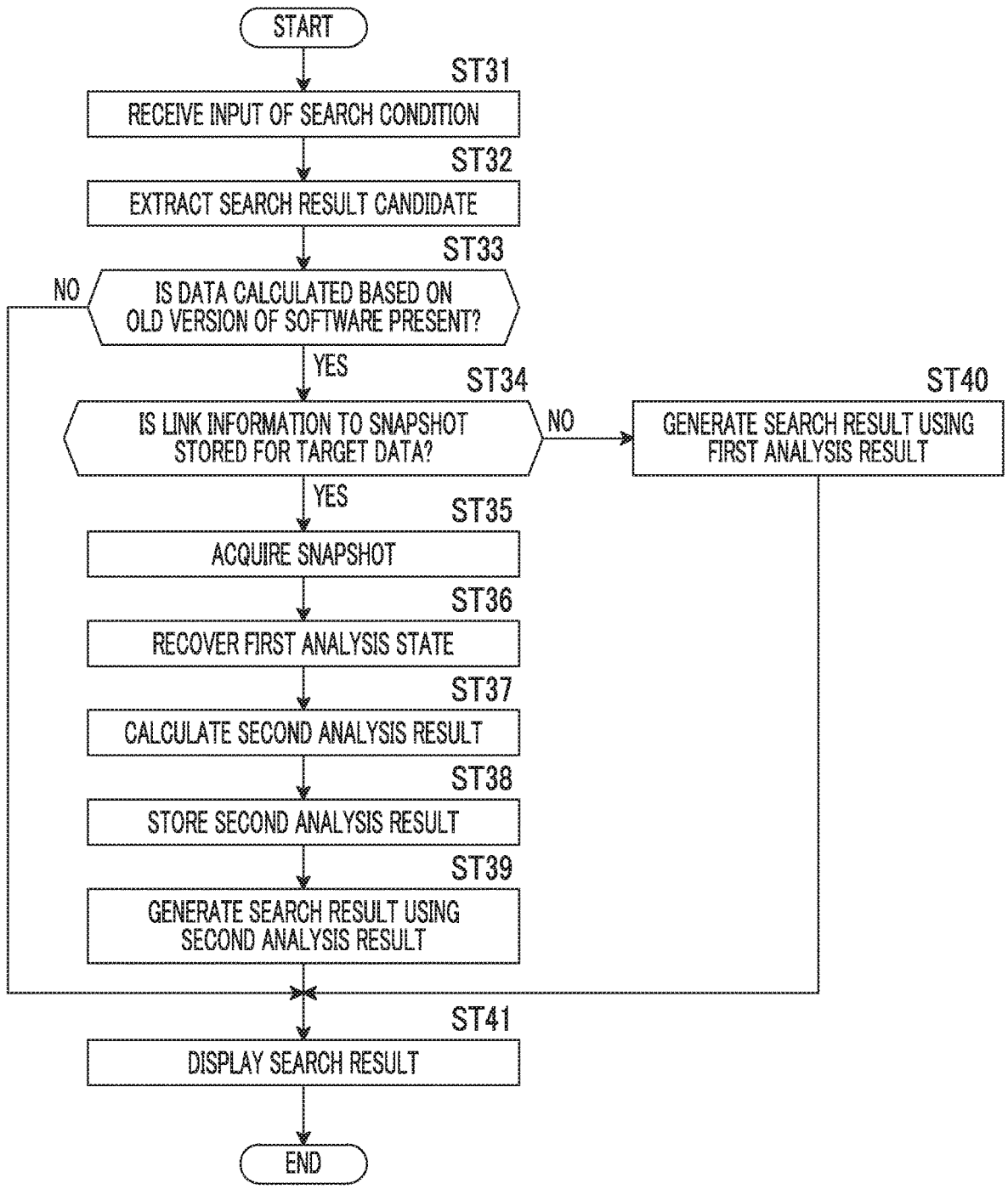
FIG. 9 is a flowchart illustrating a process performed at the time of search in a second embodiment.

FIG. 9 is a flowchart illustrating a process performed at the time of search in the second embodiment. The database 30 stores the data illustrated in FIG. 5. In the data illustrated in FIG. 5, for data having the patient ID of ID 1234 and ID 1236, the tumor is extracted based on version 1.1 of the software. For data having the patient ID of ID 1235, the tumor is extracted based on updated version 1.2 of the software. In addition, the search condition is the same as that in the first embodiment. First, the search unit 24 receives the input of the search condition from the input unit 15 (step ST31), searches the database 30 stored in the first server 3 in accordance with the search condition, and extracts data complying with the search condition as the search result candidate (step ST32).

The search unit 24 determines whether or not data in which the diameter of the tumor is calculated based on the old version of the software is present (step ST33). This determination may be performed by referring to the version of the software stored in the database 30. In a case where a positive determination is made in step ST33, a determination as to whether or not the link information to the snapshot is stored in the database 30 for the data (hereinafter, referred to as target data) in which the diameter of the tumor is calculated based on the old version of the software is performed (step ST34). In a case where a positive determination is made in step ST34, the analysis unit 22 acquires the snapshot from the link information stored in the database 30 (step ST35) and recovers the first analysis state that is the analysis state in the case of generating the analysis result stored in the database 30, that is, the first analysis result (step ST36). The analysis unit 22 performs the analysis process based on the new version of the software, that is, the second analysis process, using the recovered first analysis state and calculates the diameter of the tumor, that is, the second analysis result, by extracting the tumor (step ST37). In this case, by using the first analysis state, the process of extracting the liver and the surrounding tissues from the 3-dimensional image G0, the process of selecting the tomogram image to extract the tumor, and a process such as processing necessary for analysis of the 3-dimensional image G0 do not need to be performed again. Then, the storage unit 23 transmits the second analysis result to the first server 3 and stores the second analysis result in the database 30 (step ST38). In this case, the second analysis result is stored in the database 30 instead of the first analysis result. In addition, the search unit 24 generates the search result using the second analysis result as the diameter of the tumor in the target data (step ST39).

In a case where a negative determination is made in step ST34, the snapshot cannot be used for the target data. Thus, for the target data, the search unit 24 generates the search result using the first analysis result calculated based on the old version of the software and stored in the database 30 (step ST40).

The search unit 24 displays the search result on the display 14 (step ST41), and the process is finished. In a case where a negative determination is made in step ST33, a transition is made to step ST41, and the search result candidate is displayed on the display 14 as the search result.

FIG. 10 is a diagram illustrating the search result displayed on the display 14 in the second embodiment. The search result includes the sex and age of the patient and the tumor diameter in accordance with the search condition. In addition, the search result includes the used version of the software. In the database 30 illustrated in FIG. 3, for data having the patient ID of ID 1234 and ID 1236, the diameter of the tumor is calculated based on the old version of the software. In the search result, the diameter of the tumor is calculated based on new version 1.2 of the software for all data. In a case where the snapshot cannot be acquired for data having the patient ID of ID 1236 and ID 1237, information related to the version and the diameter of the tumor in the data having the patient ID of ID 1236 and ID 1237 are old as illustrated in FIG. 11.

While the second analysis result is stored in the database 30 instead of the first analysis result in the second embodiment, the second analysis result may be stored in the database along with the first analysis result. FIG. 12 is a diagram illustrating the database storing the second analysis result along with the first analysis result. In the database 30 illustrated in FIG. 12, the link information is not shown for simplification of description. In addition, for all data, the first analysis process is performed based on the old version, that is, version 1.1, of the software, and the first analysis result is stored in the database 30. In this case, the search result includes the diameter of the tumor for each of the two versions as illustrated in FIG. 13.

In the database 30, the operator may correct the analysis result calculated by the analysis unit 22. In addition, the database 30 may include the analysis result calculated by the operator. In this case, it is preferable that information indicating that the operator corrects or calculates data is stored in the database 30. In the case of storing the second analysis result in the database 30 instead of the first analysis result, it is preferable that the second analysis result is not stored in the database 30 instead of the first analysis result for data in which the information indicating that the operator corrects or calculates data is stored.

Next, a third embodiment of the present invention will be described. A configuration of an image analysis apparatus according to the third embodiment is the same as the configuration of the image analysis apparatus according to the first embodiment illustrated in FIG. 2, and only the performed process is different. Thus, a detailed description of the apparatus will not be repeated. In the third embodiment, the reliability of the diameter of the tumor, that is, the second analysis result, calculated based on the new version of the software in the second embodiment is calculated, and the second analysis result is stored in the database 30 only in a case where the reliability satisfies a storage condition for the database 30.

Figure 14:
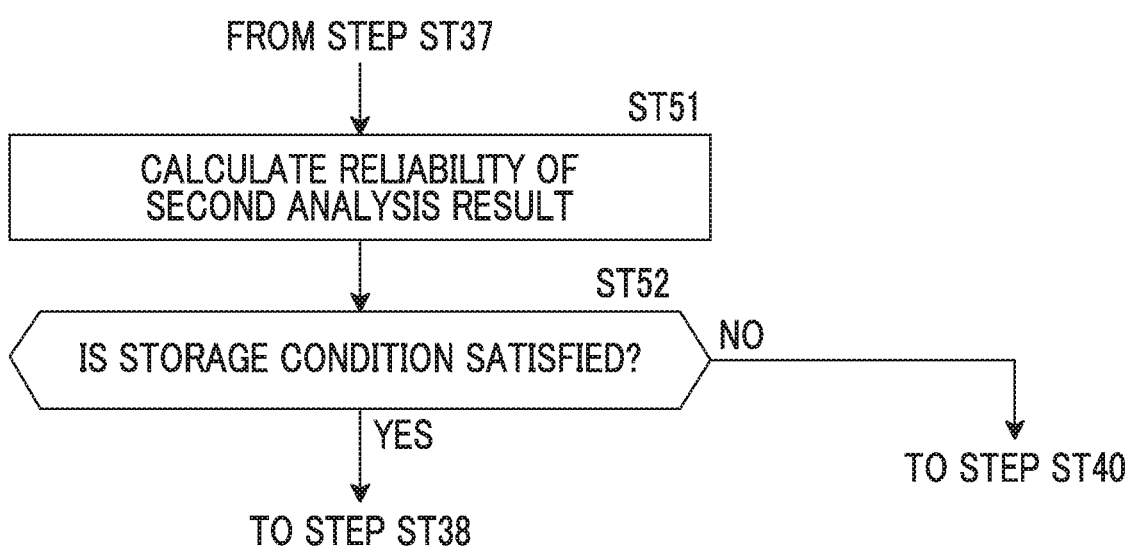
FIG. 14 is a flowchart illustrating a process performed at the time of search in a third embodiment.

FIG. 14 is a flowchart illustrating a process performed at the time of search in the third embodiment. In the third embodiment, only the process after step ST37 in the flowchart of the second embodiment illustrated in FIG. 9 is different from the second embodiment. Thus, only the process after step ST37 of the flowchart illustrated in FIG. 9 will be described. In a case where the second analysis result is calculated in step ST37 of the flowchart in FIG. 9, the analysis unit 22 calculates the reliability of the second analysis result for the target data (step ST51). Specifically, the ratio of the diameter of the tumor calculated based on the new version of the software, that is, the second analysis result, to the diameter of the tumor calculated based on the old version of the software, that is, the first analysis result, is calculated as the reliability. The storage unit 23 determines whether or not the reliability for the target data satisfies the storage condition for the database (step ST52). Specifically, in a case where the second analysis result is greater than or equal to twice the first analysis result and the reliability is greater than or equal to 2, or in a case where the second analysis result is less than or equal to ½ of the first analysis result and the reliability is less than or equal to ½, it is determined that the storage condition is not satisfied. That is, in a case where the reliability exceeds 0.5 and is less than 2, it is determined that the storage condition is satisfied.

In a case where a positive determination is made in step ST52, a transition is made to the process of step ST38 of the flowchart illustrated in FIG. 9, and the process from step ST38 is performed. That is, the storage unit 23 transmits the second analysis result to the first server 3 and stores the second analysis result in the database 30. The search unit 24 generates the search result using the second analysis result and displays the search result on the display 14. The process is finished. In a case where a negative determination is made in step ST52, a transition is made to the process of step ST40 of the flowchart illustrated in FIG. 9, and the process from step ST40 is performed. That is, the search result is generated using the first analysis result. The search result is displayed on the display 14, and the process is finished.

By calculating the reliability of the second analysis result and storing the second analysis result in the database 30 only in a case where the reliability satisfies the storage condition for the database 30, only a reliable analysis result can be stored in the database 30.

Figure 16:
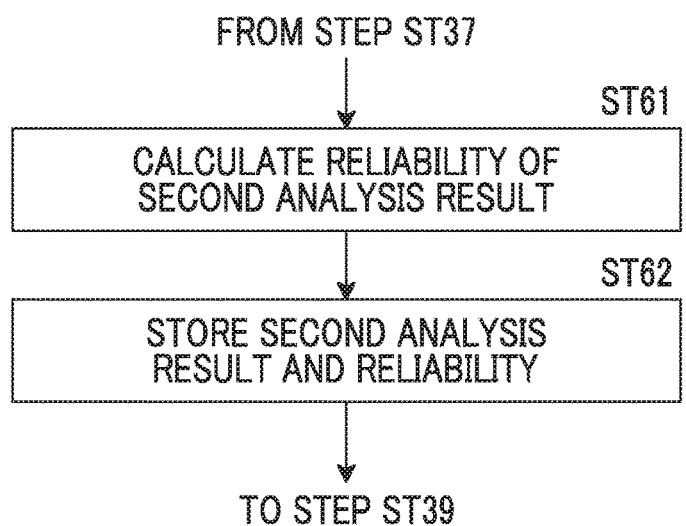
FIG. 16 is a diagram illustrating a search result in the modification example of the third embodiment.

While the reliability of the second analysis result in the second embodiment is calculated in the third embodiment, the reliability of the second analysis result in the first embodiment may be calculated. In this case, in a case where the representative value of the signal values of the tumor is calculated based on the new version of the software, the diameter of the tumor may be calculated, and the ratio of the diameter of the tumor calculated based on the new version of the software to the diameter of the tumor calculated based on the old version of the software may be calculated as the reliability. In a case where the reliability does not satisfy the storage condition for the database 30, the representative value of the signal values may not be stored in the database. In this case, as illustrated in FIG. 15, information "not calculated" is stored in the database in the representative value in data having the patient ID of ID 1234 for which the reliability does not satisfy the storage condition. In addition, the search result in this case is illustrated in FIG. 16. In a case where the representative value of the signal values is not stored in the database, data having the patient ID of ID 1234 includes information "not calculated" in the representative value as illustrated in FIG. 16.

Next, a fourth embodiment of the present invention will be described. A configuration of an image analysis apparatus according to the fourth embodiment is the same as the configuration of the image analysis apparatus according to the first embodiment illustrated in FIG. 2, and only the performed process is different. Thus, a detailed description of the apparatus will not be repeated. In the fourth embodiment, the reliability of the diameter of the tumor, that is, the second analysis result, calculated based on the new version of the software in the second embodiment is calculated, and the second analysis result is stored in the database 30 along with the reliability.

FIG. 17 is a flowchart illustrating a process performed at the time of search in the fourth embodiment. In the fourth embodiment, only the process after step ST37 in the flowchart of the second embodiment illustrated in FIG. 9 is different from the second embodiment. Thus, only the process after step ST37 of the flowchart illustrated in FIG. 9 will be described. In a case where the second analysis result is calculated in step ST37 of the flowchart in FIG. 9, the analysis unit 22 calculates the reliability of the second analysis result for the target data in the same manner as the third embodiment (step ST61). The storage unit 23 stores the second analysis result and the reliability for the target data in the database (step ST62). A transition is made to the process of step ST39 of the flowchart illustrated in FIG. 9, and the process from step ST39 is performed. That is, the search unit 24 generates the search result using the second analysis result. The search result is displayed on the display 14, and the process is finished.

FIG. 18 is a diagram illustrating the database storing the second analysis result and the reliability in the fourth embodiment. As illustrated in FIG. 18, the diameter of the tumor calculated based on new version 1.2 of the software and the reliability are stored in the database 30. In the database illustrated in FIG. 18, the reliability is 1.2, 1.0, and 2.4 for data having the patient ID of ID 1234, ID 1235, and ID 1236, respectively.

FIG. 19 is a diagram illustrating the search result in the fourth embodiment. As illustrated in FIG. 19, the analysis result includes the diameter of the tumor and the reliability for each of the two versions.

In the fourth embodiment, the reliability of the second analysis result is calculated, and the reliability is stored in the database 30 in association with the second analysis result. Thus, a determination as to whether or not the second analysis result is reliable can be made when the database 30 is referred to. Particularly, in a case where it is considered that the image of the tumor extracted by the second analysis process is used as learning data of a self-learning algorithm for detecting the tumor, appropriate learning cannot be performed in a case where the reliability of the analysis result is low, since the extraction of the tumor may not be accurately performed. By storing the reliability in association with the second analysis result as in the fourth embodiment, the reliability of the second analysis result can be determined. Thus, only a reliable second analysis result can be used as the learning data. Accordingly, learning using the learning data can be appropriately performed.

In each embodiment, the snapshot is stored in the second server 5, and the link information to the snapshot is stored in the database 30. Alternatively, the snapshot may be stored in the first server 3, and the snapshot may be associated with each data stored in the database 30.

In addition, in each embodiment, the second analysis process is performed at the time of search. Alternatively, access to the database 30 from the image analysis apparatus 1 may be made per certain period of time, and the second analysis process may be performed in a case where data not storing the second analysis result is present. Alternatively, access to the database 30 from the image analysis apparatus 1 may be made in a case where the operator provides an instruction from the input unit 15, and the second analysis process may be performed in a case where data not storing the second analysis result is present.

In addition, in the embodiments, the 3-dimensional image is used as the target of the analysis process. Alternatively, a 2-dimensional image such as an X-ray image may be used as the target of analysis. In addition, in the embodiments, the liver is used as the target of the analysis process. Alternatively, another organ such as a heart, a lung, or a brain may be used as the target of the analysis process.

Hereinafter, the effect of the present embodiment will be described.

By searching for the second analysis result for the image stored in the database and performing the second analysis process only in a case where only the first analysis result is associated and the recovery information or the link information is associated with the first analysis result, the second analysis process can be more efficiently performed.

By calculating the reliability of the second analysis result and storing the second analysis result in the database only in a case where the reliability satisfies the storage condition for the database, only a reliable analysis result can be stored in the database.

By calculating the reliability of the second analysis result and storing the reliability in the database in association with the second analysis result, a determination as to whether or not the second analysis result is reliable can be made when the database is referred to. Particularly, in a case where it is considered that the second analysis result is used as the learning data of the self-learning algorithm, appropriate learning cannot be performed in a case where the reliability of the analysis result is low. By storing the reliability in association with the second analysis result, the reliability of the second analysis result can be determined. Thus, only a reliable second analysis result can be used as the learning data. Accordingly, learning using the learning data can be appropriately performed.

What is claimed is:

1. An image analysis apparatus comprising:
a processor configured to:
store at least one first analysis result generated by performing at least one first analysis process on an image of a subject and recovery information enabling recovery of a first analysis state where the first analysis result is generated or link information to the recovery information in a database in association with subject information specifying the subject;
generate, in a case where at least one second analysis process generating at least one second analysis result different from the first analysis result is performed, the second analysis result by performing the second analysis process using the recovery information; and
store the second analysis result in the database in association with the subject information.

2. The image analysis apparatus according to claim 1, wherein the processor is further configured to recover the first analysis state based on the recovery information and performs the second analysis process using the first analysis state.

3. The image analysis apparatus according to claim 1, wherein the processor is further configured to:
search the database for the second analysis result, and
perform the second analysis process only in a case where only the first analysis result is associated and the recovery information or the link information is associated with the first analysis result.

4. The image analysis apparatus according to claim 1, wherein the processor is further configured to:
calculate reliability of the second analysis result, and
store the second analysis result in the database only in a case where the reliability satisfies a storage condition for the database.

5. The image analysis apparatus according to claim 1, wherein the processor is further configured to:
calculate reliability of the second analysis result, and
store the reliability in the database in association with the second analysis result.

6. The image analysis apparatus according to claim 1, wherein the processor is further configured to store the second analysis result in the database in addition to the first analysis result.

7. The image analysis apparatus according to claim 1, wherein the processor is further configured to store the second analysis result in the database instead of the first analysis result.

8. An image analysis method comprising:
- storing at least one first analysis result generated by performing at least one first analysis process on an image of a subject and recovery information enabling recovery of a first analysis state where the first analysis result is generated or link information to the recovery information in a database in association with subject information specifying the subject;
- generating, in a case where at least one second analysis process generating at least one second analysis result different from the first analysis result is performed, the second analysis result by performing the second analysis process using the recovery information; and
- storing the second analysis result in the database in association with the subject information.

9. A non-transitory computer-readable storage medium that stores an image analysis program causing a computer to execute:
- a procedure of storing at least one first analysis result generated by performing at least one first analysis process on an image of a subject and recovery information enabling recovery of a first analysis state where the first analysis result is generated or link information to the recovery information in a database in association with subject information specifying the subject;
- a procedure of generating, in a case where at least one second analysis process generating at least one second analysis result different from the first analysis result is performed, the second analysis result by performing the second analysis process using the recovery information; and
- a procedure of storing the second analysis result in the database in association with the subject information.

* * * * *